United States Patent [19]

Coleman

[11] Patent Number: 5,129,770
[45] Date of Patent: Jul. 14, 1992

[54] ARMADILLO TAMPER RESISTANT BOLT AND HEAD PROTECTOR

[76] Inventor: Kirby D. Coleman, 5011 56th Pl., Hyattsville, Md. 20781

[21] Appl. No.: 729,531

[22] Filed: Jul. 15, 1991

[51] Int. Cl.⁵ .............................................. A47G 3/00
[52] U.S. Cl. ..................... 411/373; 411/377; 411/429; 411/910
[58] Field of Search ............... 411/371, 372, 373, 396, 411/377, 431, 429, 430, 910

[56] References Cited

U.S. PATENT DOCUMENTS

| | | | |
|---|---|---|---|
| 3,298,272 | 1/1967 | Henderson | 411/910 X |
| 4,293,243 | 10/1981 | Graybeal et al. | 411/373 X |
| 4,582,462 | 4/1986 | Thiel | 411/377 X |
| 4,907,929 | 3/1990 | Johnston, Jr. | 411/377 X |

FOREIGN PATENT DOCUMENTS

| | | | |
|---|---|---|---|
| 49216 | 7/1911 | Austria | 411/429 |
| 636531 | 3/1962 | Italy | 411/377 |
| 916161 | 1/1963 | United Kingdom | 411/373 |

*Primary Examiner*—Rodney M. Lindsey
*Attorney, Agent, or Firm*—John B. Dickman, III

[57] ABSTRACT

A tamper proof protective cover for cap screws. The cover is installed over either the head or nut, depending which is exposed to vandalism. There is a hemispherical or dome shaped surface with a slightly angled bottom to prevent getting a grip on the cover. A blind bore with a compression ring and gripping rings extending from the flat bottom surface into the blind bore. The protective cover is installed using a special tool by placing the bore over the head or nut of a cap screw and driving down on the head or nut. The gripping rings engage and either binds with or penetrates the edges of the head or nut.

7 Claims, 1 Drawing Sheet

ARMADILLO TAMPER RESISTANT BOLT AND HEAD PROTECTOR

BACKGROUND OF THE INVENTION

This invention relates to a tamper proof protective cover for the head of a cap screw, and in particular, to a tamper proof protective cover that once in place can not be removed without destroying the cap screw.

Vending machines are placed in public areas for the convenience of the public. Unfortunately, they are often vandalized for merchandise and money. Not only does the machine owner lose merchandise and money, but the machine may be damaged beyond repair, all of which causes considerable financial loss. There is also the possible liability regarding the safety and maintenance of the machine and the potential harm to the public.

Often, vending machines are broken into by removing the cap screws or bolts holding a lock in place. There have been many solutions to the problem of vandals removing cap screws including, but not limited to, special heads for the screws that require special tools to remove the screws, and protective covers for the screw heads. The special head cap screw has had success, however, creative people have learned how to remove the screw. Protective covers have also had some success until the vandals learned to remove them. The following U.S. Patents show protective screw head covers of interest:

U.S. Pat. No. 1,048,902, issued to Simons
U.S. Pat. No. 1,152,960, issued to Molonewy
U.S. Pat. No. 2,133,785, issued to Murphy
U.S. Pat. No. 3,122,051, issued to Greene
U.S. Pat. No. 3,298,272, issued to Henderson
U.S. Pat. No. 3,548,704, issued to Kutryk
U.S. Pat. No. 3,881,391, issued to Dereszynski
U.S. Pat. No. 4,582,462, issued to Thiel
U.S. Pat. No. 4,717,301, issued to Oddenio

SUMMARY OF THE INVENTION

The tamper proof protective cover of the present invention is readily usable on the heads of cap screws. However, difficult size covers are required to match the various size cap screws. No matter what size cover is used there are certain characteristics such as a hemispherical or dome shape that is not conducive to being gripped by plyers or similar gripping tools. A flat bottom and the need of an installation tool is common between all of the present covers.

The tamper proof protective cover has a blind bore which extends into the dome shape, where the bore is of a size to snugly fit over the head of a cap screw or of the cap screw nut. There are at least two gripping rings that are slightly smaller in diameter than the widest distance across the head or nut, whereby the gripping rings must be forced on the cap screw. Where the cover is of a harder material or a similar material as the cap screw, the gripping rings will actually penetrate the edges of the head or nut creating a more permanent union of the cover and head or nut. Where the cover is of a softer material the gripping rings bind on the edges of the head or nut creating a less permanent but still strong union between the cover and head or nut.

The flat bottom surface of the domed shaped cover is angled such that there is either a space showing around the outside edge of the flat surface or the innermost edge of the flat surface, where the blind bore begins. A compression ring, which is a part of the flat surface and formed by a groove in the blind bore just above the flat surface, applies an upward force when the cover has been installed to force the gripping rings to penetrate the head or nut of a cap screw. In addition, once the compression ring is installed, the angle of the flat surface is less, leaving little or no space to insert a prying tool between the cover and an additional surface to pry on the cover.

DESCRIPTION OF THE INVENTION

Figure 1:
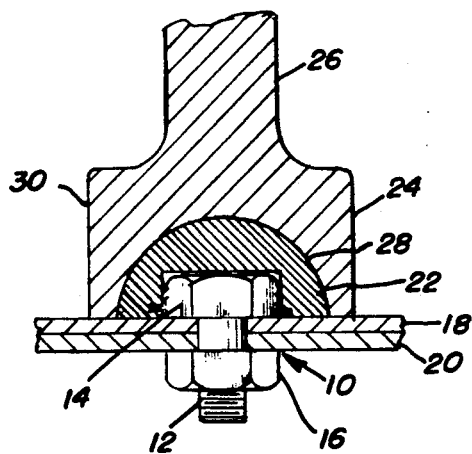
FIG. 1 is a cross section view of a tamper proof protective cover of the invention and a partial cross section view of a tool for installing a tamper proof protective cover.

Referring to the drawings, FIGS. 1-6, there is shown a cap screw 10 having a threaded shaft 12 and a head 14. A nut 16 fastens the cap screw 10 to two sheets of metal 18 and 20, respectively. The head 14 is the typical hex head found on most cap screws. Other type of heads will work with the tamper proof protective cover such as the allen head of torex head. The cap screw and nut shown are made from steel used to produce grade 2, 5, 8 or 12 cap screws, of the comparable metric cap screws.

Figure 4:
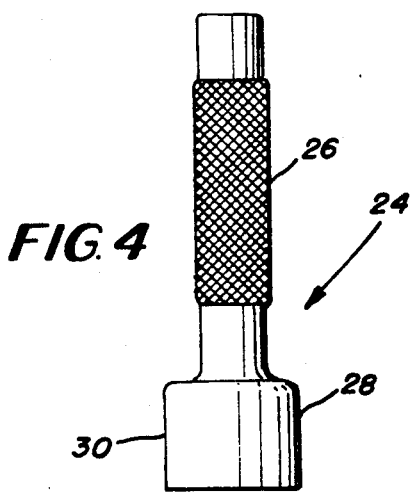
FIG. 4 shows an installing tool for installing a tamper proof protective cover.
Figure 5:
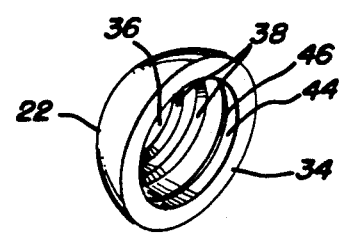
FIG. 5 is a perspective view showing a tamper proof protective cover.

FIG. 1 shows a tamper proof protective cover 22 driven on the head 14 by an installation tool 24. The installation tool 24 has a convex surface 26 which fits over the domed shaped cover 22. For each size cover, there is a different tool head. Another view of the installation tool 24 is shown in FIG. 4, where there is a handle portion 26 and an anvil 28 connected to a head end 30.

Figure 2:
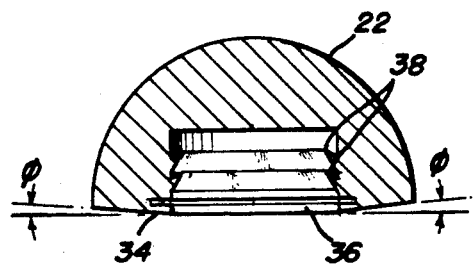
FIG. 2 is another cross section view of a tamper proof protective cover of the invention.
Figure 3:
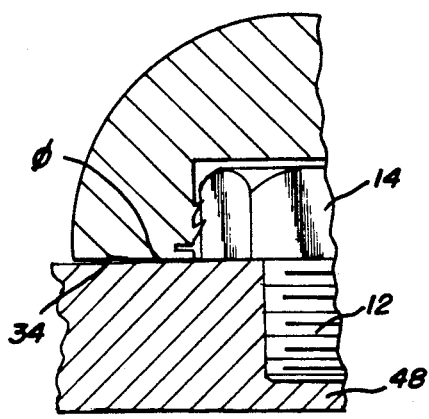
FIG. 3 is a cross section view of a tamper proof protective cover showing the cover installed on the head of a cap screw.
Figure 6:
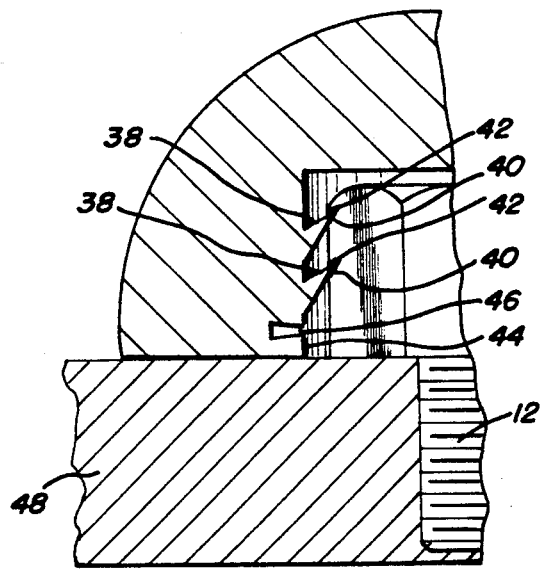
FIG. 6 is another cross section view showing the gripping rings and compression ring of the invention.

The protective cover 22 is shown in FIGS. 2, 3 and 6 in cross section. The cover 22 has a hemispherical shape or dome shape 32 and a flat surface 34. Flat surface 34 has a slight angle at or about one degree, which will be explained in more detail. A blind bore 36 extends from the flat surface 34 into the dome shape 32. The length of the bore is greater than the thickness of the cap screw head 14 to accommodate the head 14 and have the flat surface 34 rest on the surface on which the cap screw is fastened, as in FIGS. 3 and 6. The blind bore 36 has gripping rings 38 which either penetrate the edges of the hexhead 14 or bind with the head to prevent removal of the cover. The rings 38 are continuous around the surface of the bore 36, so it does not require that the cover be aligned in and particular way to work. The rings 38 are better shown in FIG. 6 to have a sharp edge 40 that will dig into the edge of the head causing a depression 42 in said head 14.

A compression ring 44 is located where the flat bottom surface 34 meets the blind bore 36 and its integral with the flat surface. The compression ring 44 is also defined by a compression groove 46 above the ring. Compression groove 46 extends around the wall of the bore 36.

When the installation toll is placed over the dome shaped cover 22 and struck by a hammer, the cover is driven down on the head of the cap screw until the flat bottom surface 34 contacts a metal plate such as 18 in FIG. 1, or 48 in FIGS. 3 or 6. At the moment the flat bottom surface 34 contacts the plate, the downward force compresses compression ring 44 into groove 46, while at the same moment gripping rings 38 are binding with the edges of the hexhead 14. Instantly, after the compression ring 44 has compressed, it exerts a downward force pushing the gripping rings 38 upwardly to embed in the edges of head 14.

After the cover 22 has been installed the one degree angle $\phi$, which in FIG. 3 extends inwardly and in FIG. 6 outwardly, either completely as in FIG. 3 or almost completely as FIG. 6 seals the edges of the cover. The angle $\phi$ extends along the flat surface 24 from the outside edge 48 to the inside edge 50.

If a softer material, such as wood or plastic, is used to manufacture the cover, the gripping rings 38 wedge against the cap screw head 14. Compression ring 44 compresses into groove 46, but does not exert appreciable downward force. However, the angle $\phi$ does not seal the edge of the cover.

While only two embodiments of the invention have been shown, there may be other embodiments realized by one skilled in the art. Therefore, in order to fully understand the scope of the invention one should refer to the drawings, description and claims.

I claim:

1. A tamper proof protective cover for protecting the exposed end of a cap screw nut and head comprising:
   a solid protective cover having a hemispherical top portion and a flat bottom surface;
   a blind bore extending from said flat bottom surface into said hemispherical top portion, where said blind bore has a diameter about the same dimension as the distance across the widest point across a head and nut of a cap screw;
   at least one gripping ring means in said blind bore to engage the exposed nut and head of a cap screw;
   a compression ring integral with said solid protective cover extending in the same plane as said flat bottom surface and extending to said blind bore, wherein said compression ring is defined by a compression groove above said compression ring providing an area for said compression ring to compress into.

2. A tamper proof protective cover as in claim 1 wherein said gripping ring means includes a sharp edge to penetrate edges of a nut and head of a cap screw.

3. A tamper proof protective cover as in claim 2 wherein there are two gripping rings.

4. A tamper proof protective cover as in claim 3 wherein said flat bottom surface having an inside edge and an outside edge, said flat bottom surface has an angle which extends from said inside edge to said outside edge.

5. A tamper proof protective cover as in claim 4 wherein said angle is one degree.

6. A tamper proof protective cover as in claim 3 wherein said flat bottom surface having an inside edge and an outside edge, said flat bottom surface has an angle which extends from said inside edge.

7. A tamper proof protective cover as in claim 6, wherein said angle is one degree.

* * * * *